(12) United States Patent
Fünger et al.

(10) Patent No.: US 6,543,441 B2
(45) Date of Patent: Apr. 8, 2003

(54) APPARATUS FOR UTILIZING SOLAR ENERGY

(75) Inventors: Friedrich Fünger, Leverkusen (DE); Reinhold Kappenstein, Odenthal (DE); Lieven Ven, Antwerpen (BE); Jacques De Lalaing, Zandbergen (BE)

(73) Assignees: Bayer Aktiengesellschaft, Leverkusen (DE); Suria Holdings S.A.R.L., Luxembourg (LU)

( * ) Notice: Subject to any disclaimer, the term of this patent is extended or adjusted under 35 U.S.C. 154(b) by 0 days.

(21) Appl. No.: 09/898,931

(22) Filed: Jul. 3, 2001

(65) Prior Publication Data

US 2002/0078945 A1 Jun. 27, 2002

(30) Foreign Application Priority Data

Jul. 6, 2000 (DE) .......................... 100 32 882

(51) Int. Cl.[7] .................................. F24J 2/38
(52) U.S. Cl. ........................ 126/606; 126/607
(58) Field of Search ................. 126/606, 607, 126/687

(56) References Cited

U.S. PATENT DOCUMENTS

| | | | | |
|---|---|---|---|---|
| 1,220,091 A | * | 3/1917 | Goff | 126/607 |
| 1,683,266 A | * | 9/1928 | Shipman | 126/607 |
| 4,038,971 A | * | 8/1977 | Bezborodko | 126/606 |
| 4,114,594 A | * | 9/1978 | Meyer | 126/606 |
| 4,205,661 A | * | 6/1980 | Chapman | 126/604 |
| 4,343,294 A | | 8/1982 | Daniel | |
| 5,228,924 A | | 7/1993 | Barker et al. | |
| 5,542,409 A | * | 8/1996 | Sampayo | 126/606 |

FOREIGN PATENT DOCUMENTS

WO 99/42765 8/1999

* cited by examiner

Primary Examiner—Henry Bennett
Assistant Examiner—Alfred Basichas
(74) Attorney, Agent, or Firm—Joseph C. Gil; James R. Franks

(57) ABSTRACT

An apparatus for utilising solar energy is described. The apparatus comprises:

(a) a plurality of movable mirrors (3) which are arranged in parallel next to one another, are orientable according to the solar altitude, and are fastened on carriers (10, 10');

(b) at least one stationary collector (14) for absorbing the radiation reflected by the mirrors (3);

(c) a drive means for rotating the mirrors (3) and carriers (10, 10') in order to orientate the mirrors (3) in such a way that the solar radiation impinging on the mirrors is reflected onto the collector (14); and (d) a framework (15) supporting said mirrors (3), said carriers (10, 10'), said stationary collector (14) and said drive means (c).

The mirrors (3) of the carriers (10) of the apparatus are mounted rotatably about an axis of rotation, that is parallel to the length of the mirrors, in such a way that the weight of the mirrors (3) and the weight of the carriers (10) are substantially in equilibrium in any position about said axis of rotation.

41 Claims, 9 Drawing Sheets

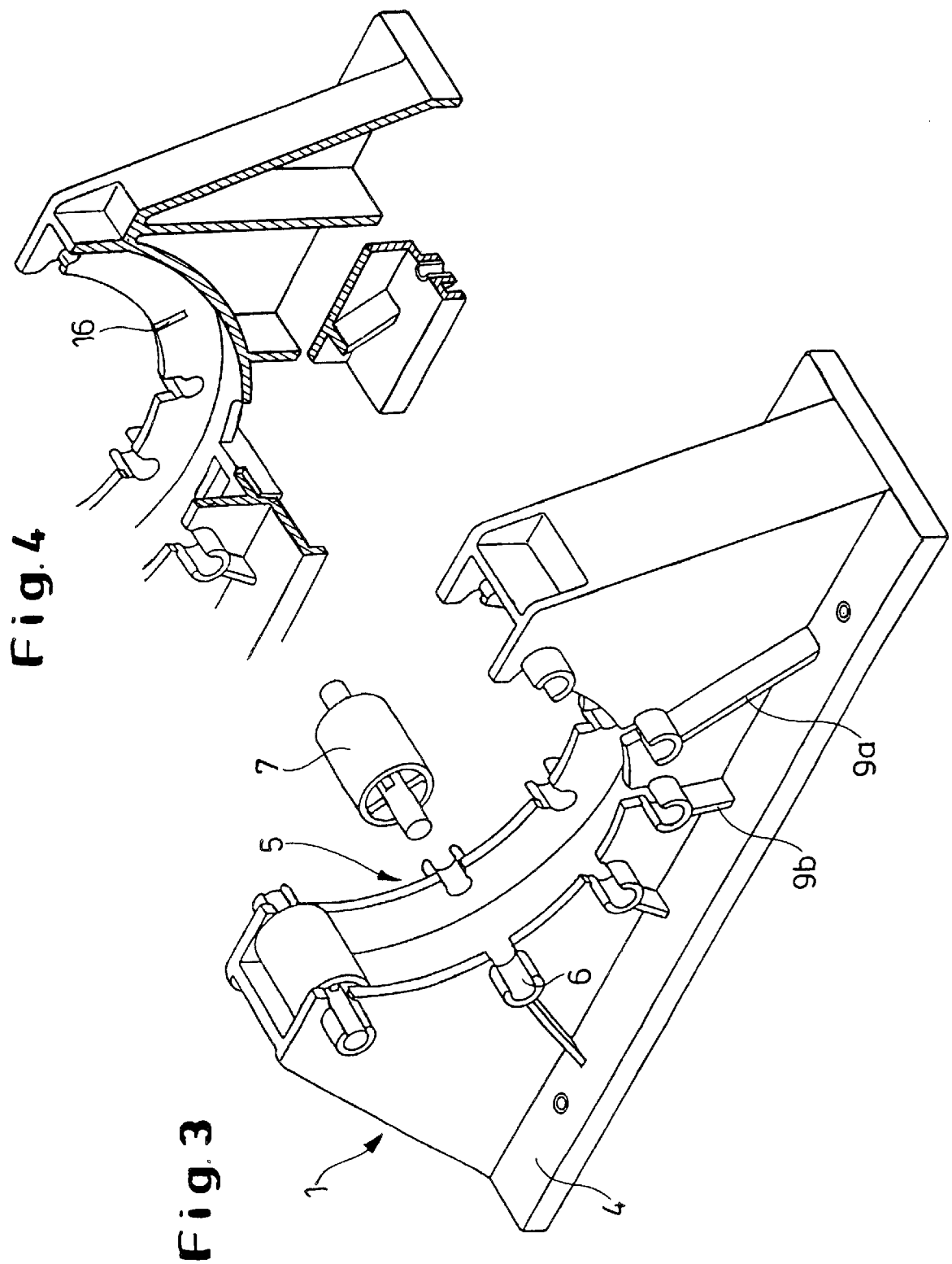

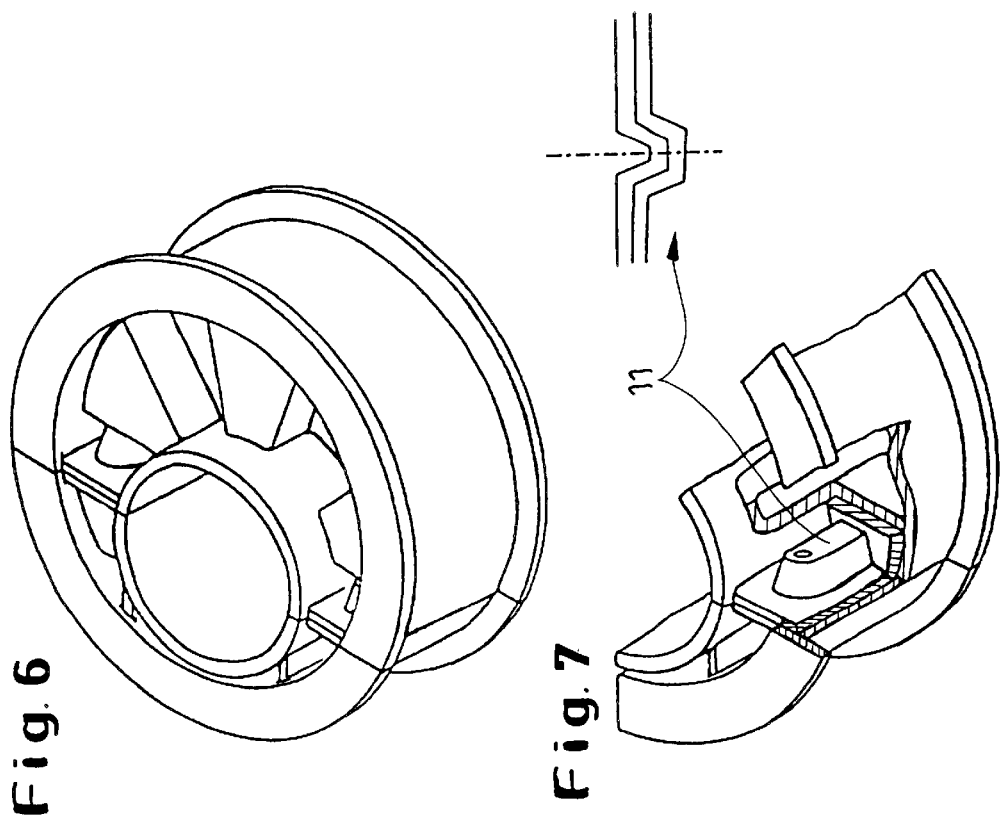
Fig. 6
Fig. 7
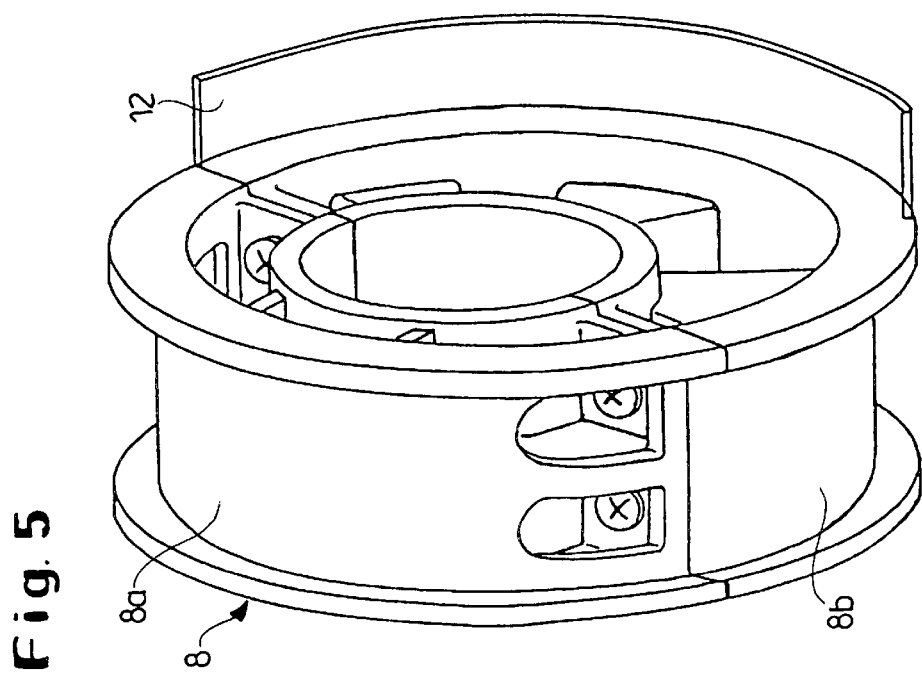
Fig. 5

APPARATUS FOR UTILIZING SOLAR ENERGY

CROSS REFERENCE TO RELATED PATENT APPLICATIONS

This patent application claims priority under 35 U.S.C. 119 (a)–(d) of German Patent Application No. 100 32 882.2, filed on Jul. 6, 2000.

FIELD OF THE INVENTION

The invention relates to an apparatus for utilising solar energy which substantially consists of a mirror construction with a large number of reflector mirrors and heat exchanger collecting tubes on which the radiation energy of the sun is focussed.

BACKGROUND OF THE INVENTION

An apparatus of this type, also known as solar heating apparatus, is known, for example, from the Offenlegungsschrift WO 99/42765. In the known apparatus, a moving mirror construction and at least one collector tube which is arranged parallel to the mirror constructions oppose one another on a frame. The solar radiation is conveyed to the collector by a plurality of flat mirrors which are arranged below the collector and are each arranged at a suitable angle to the incident solar radiation. The individual flat mirrors are connected via a mirror holder to a drive which automatically tracks the mirrors following the solar altitude. The solar heating apparatus known from WO 99/42765 has a number of drawbacks. The schematic arrangement of the drive of the mirror holder shown in the Offenlegungsschrift does not have the precision of such a drive demanded in practice. In fact, a maximum permitted deviation of the mirror orientation desirably of ±0.10 with respect to the optimum reflection angle is used as a basis in flat mirror carriers which are typically up to 200 m long.

Depending on the method of construction, moreover, the weight of the mirrors causes an enormous force which acts on the mirror holder drive and changes according to the dependency of the position of the mirrors on the mirror holder carrier.

When the solar heating apparatus is used in an external environment with a desert climate, there is a particular need to design the moving parts of the apparatus, on the one hand, precisely with respect to temperature variations. On the other hand, moving parts and other parts are to withstand stresses due to dust and sand, in particular in cylinder and roller parts of the apparatus. In particular, it should be possible to design the rolling bearings without lubrication as the fine sand can cause the lubricant to stick. It should also be possible to reduce friction in the bearings by the selection of suitable materials.

Whereas other known apparatuses for utilising solar energy have, for example, a mirror construction on parabolic large-area reflector elements, the solar heating apparatus described hereinafter is based on flat small area mirror elements.

As described, carriers and mirror elements have a considerable weight, so considerable forces are required to achieve a deflection of the mirrors with mirror carriers having a length of up to 200 m and more.

SUMMARY OF THE INVENTION

It is a further object of the invention to design the bearings arranged along the mirror carriers for rotation of the mirror carriers in such a way that they compensate the thermal expansion occurring due to the temperature difference between day and night.

In accordance with the present invention, there is provided an apparatus for utilising solar energy comprising:
  (a) a plurality of movable mirrors (3) which are arranged in parallel next to one another, are orientable according to the solar altitude, and are fastened on carriers (10, 10');
  (b) at least one stationary collector (14) for absorbing the radiation reflected by the mirrors (3);
  (c) a drive means for rotating the mirrors (3) and carriers (10, 10') in order to orientate the mirrors (3) in such a way that the solar radiation impinging on the mirrors is reflected onto the collector (14); and
  (d) a framework (15) supporting said mirrors (3), said carriers (10, 10'), said stationary collector (14) and said drive means
  wherein the mirrors (3) of the carriers (10) are mounted rotatably about an axis of rotation, that is parallel to the length of the mirrors, in such a way that the weight of the mirrors (3) and the weight of the carriers (10) are substantially in equilibrium in any position about said axis of rotation.

The features that characterise the present invention are pointed out with particularity in the claims, which are annexed to an form a part of this disclosure. These and other features of the invention, its operating advantages and the specific objects obtained by its use will be more fully understood from the following detailed description and the accompanying drawings in which embodiments of the invention are illustrated and described.

Unless otherwise indicated, all numbers ore expressions, such as those expressing structural dimensions, etc, used in the specification and claims are to be understood as modified in all instances by the term "about."

DESCRIPTION OF THE DRAWINGS

FIG. 3 shows the rolling bearing for the mirror holder of the apparatus;

FIG. 4 is an enlarged detail of the rolling bearing according to FIG. 3;

FIG. 5 is a side view of a cylinder with a drive collar;

FIG. 6 is a side view of a cylinder without a drive collar;

FIG. 7 is an enlarged detail of the cylinder in FIG. 5;

DETAILED DESCRIPTION OF THE INVENTION

Figure 1:
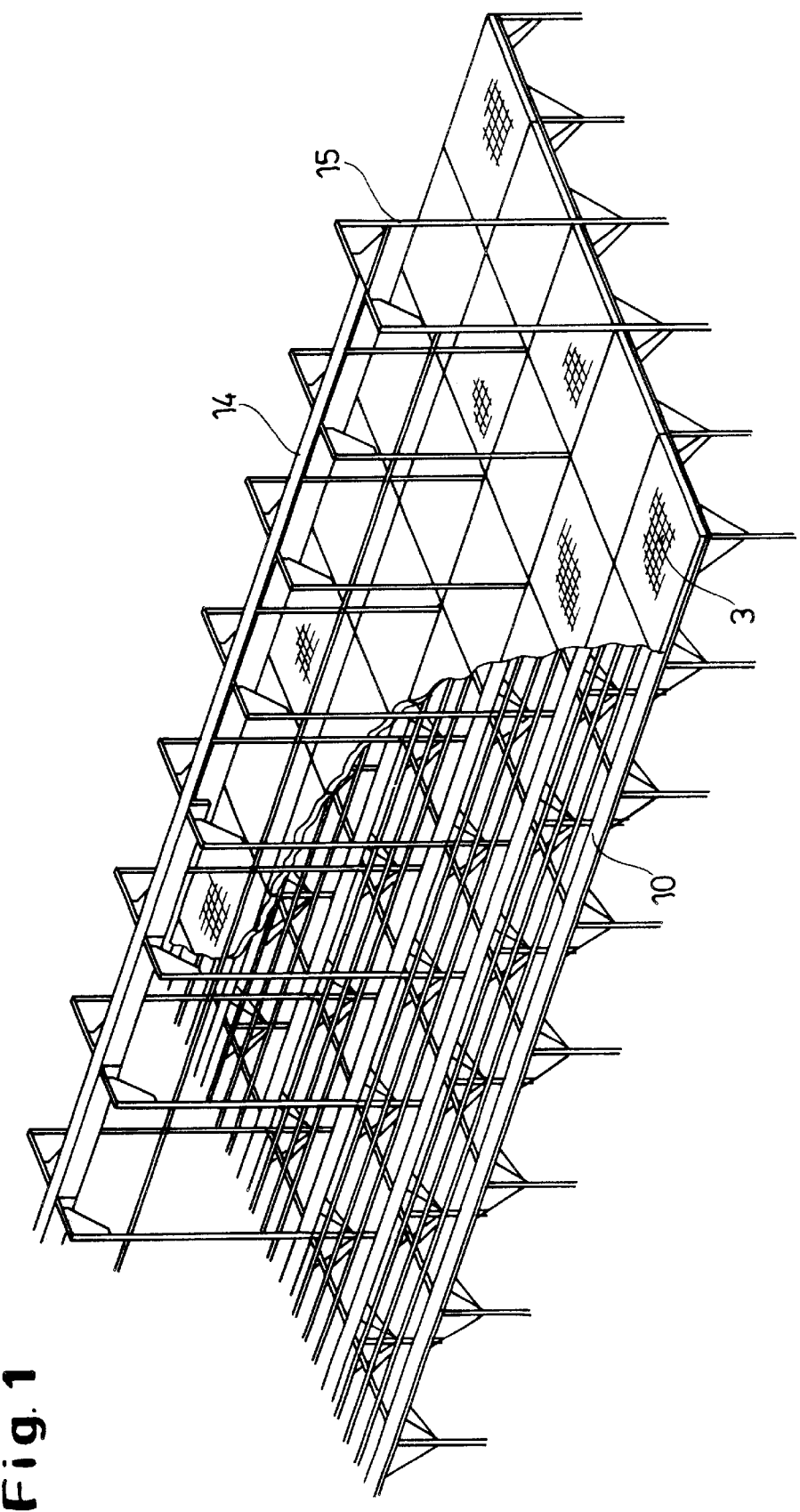
FIG. 1 is a schematic side view of a solar heating apparatus according to the invention.
Figure 2:
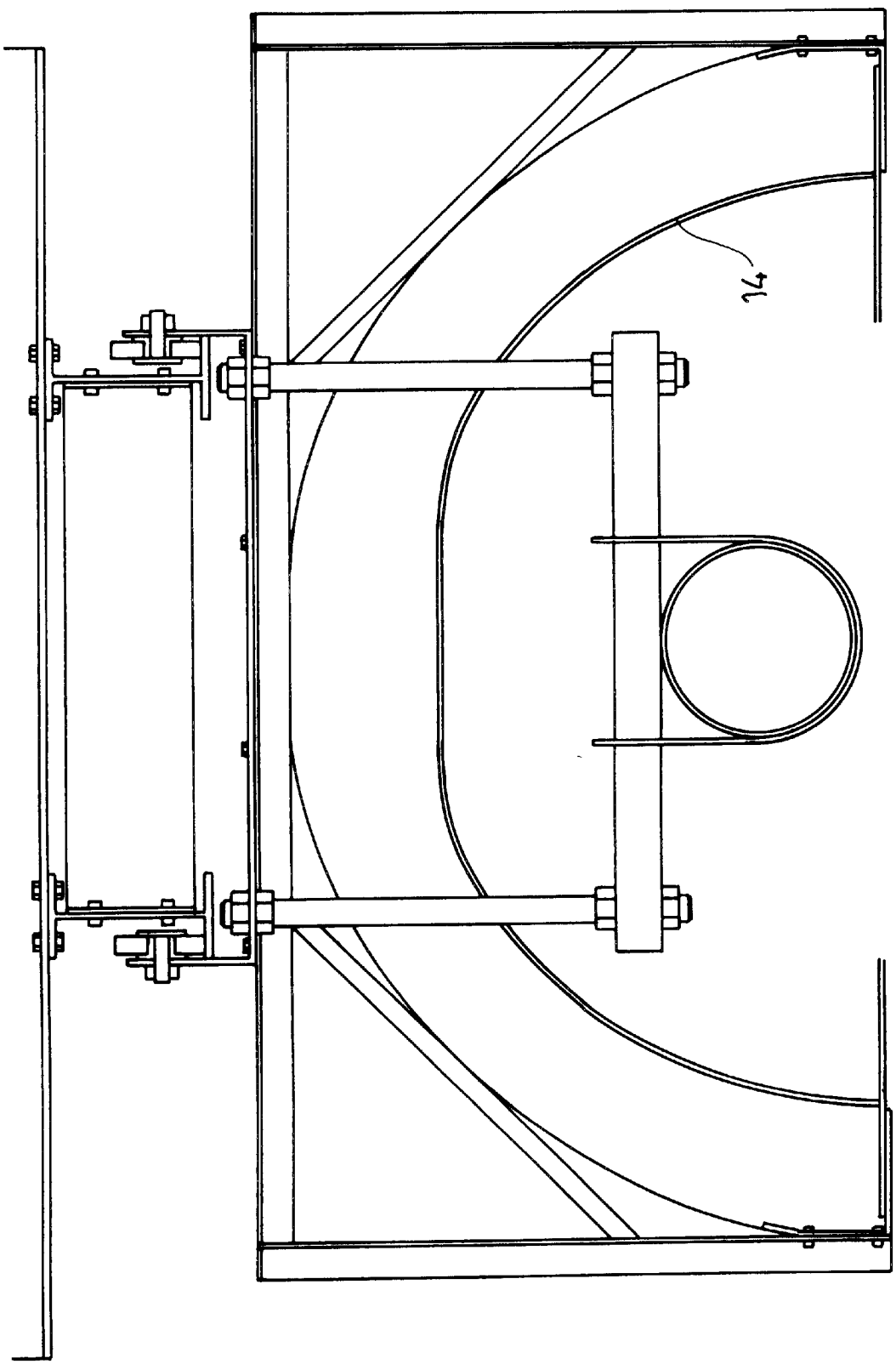
FIG. 2 is an enlarged detail of the reflector from the apparatus in FIG. 1.
Figure 9:
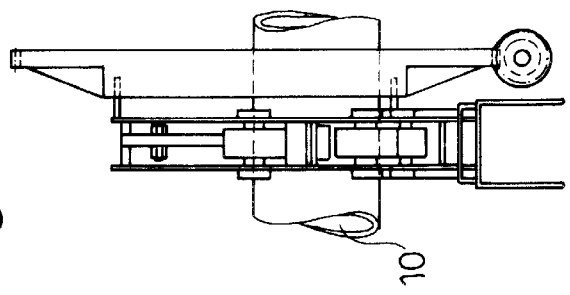
FIG. 9 is a longitudinal section through the construction in FIG. 8 in a partial elevation.

The invention relates to an apparatus for utilising solar energy based on a mirror construction with a large number of movable mirrors which are arranged, in particular, in parallel next to one another, are orientable according to the solar altitude and are fastened on carriers, with at least one, in particular, stationary collector for absorbing the radiation reflected by the mirrors, with a drive means for rotating the mirrors and carriers in order to orientate the mirrors in such a way that the solar radiation impinging on the mirrors is reflected onto the collector, and with a framework carrying the aforementioned parts, characterised in that the mirrors of a carrier are mounted rotatably about an axis of rotation (parallel to the length of the mirrors) in such a way that the weight of the mirrors and the weight of the carrier are substantially in equilibrium in any position about the axis of rotation.

A preferred design of the apparatus is characterised in that the mounting is formed by a plurality of rolling bearings connected to the carrier for the mirrors.

The carrier has, in particular, a round cross-section and is, in particular, preferably a tubular profile.

The carrier is quite particularly preferably arranged eccentrically in the cylinder of the rolling bearing.

If few fastening means are used to assemble the mirror on the carrier, it has proven helpful to provide additional vibration dampers (intermediate layer of foam rubber or polyurethane foam) between the mirrors and the carrier to prevent fluttering of the mirrors in varying wind pressure and breakage of the mirrors. A person skilled in the art is readily familiar with the calculation of the Shore hardness of the damping material required for damping purposes.

A calibration means is preferably provided on the cylinder and on the roller carrier region, in particular in the form of at least two opposing grooves into which a pin or a tongue can be inserted to fix the cylinder temporarily clearly in its position during assembly. In this way, all rollers can be placed in their rest position and can be connected to the carriers.

In an advantageous variation, the rolling bearing is formed from a foot connected to a roller carrier region with concave shaping, in particular with the geometric shape of a segment of a circle, wherein, a plurality of, in particular at least six roller bushes containing free-wheeling rollers which carry the cylinder with the mirror carriers are distributed round the periphery of the roller carrier region.

The drive means for the mirrors is preferably self-locking relative to the forces acting on the drive means from the mirrors or carriers.

At least one combination of worm and toothed disc connected directly or indirectly to a drive motor is provided as drive means, the toothed disc being connected directly to the carrier or to a cylinder. In particular, the toothed disc rests without play on the worm.

The drive worm is preferably lifted toward the toothed disc during assembly to avoid play between the toothed disc and the drive worm. This would cause the mirror position to deviate from the ideal position.

The roller bushes are arranged open, in particular as viewed toward the cylinder axis, so the rollers can be removed in the direction of the cylinder axis.

In a preferred design, the rollers with the roller bushes of the roller carrier region are held by a snap connection or form a snap connection with the roller bushes of the roller carrier region. A detachable fixing of the rollers in the bushes is thus achieved.

The curvature of the roller carrier region particularly preferably forms a semicircle.

The rollers are arranged, in particular, unsymmetrically on the periphery of the roller carrier region.

Particularly preferably, more rollers are distributed on the peripheral portion in the lower region of the roller carrier region than in the upper portions, in order to obtain a higher load-bearing capacity in the lower region.

In a particularly preferred embodiment of the invention, at least two opposing rollers support the cylinder laterally at the upper part of the roller carrier region.

The rolling bearing is preferably designed as an open framework. This method of construction simplifies exposure and cleaning of the construction and allows sand through more easily when the apparatus is used in desert regions.

To improve the absorption of force in a preferred variation, the roller bushes are provided with support struts which are moulded, in particular, by the injection moulding process, from thermoplastic polymer in a particular design are arranged radially to the curvature of the roller bushes and open at the foot of the rolling bearing.

An optional additional removable safety hoop over the cylinder which passes from arm to arm on the rolling bearing, prevents undesirable lifting of the cylinder and therefore of the mirror holder from the bearing.

In a preferred variation, the cylinder which is connected to the mirror carrier has a divisible design, in particular a two-part design. This enables individual cylinders of the far-reaching mirror carriers to be exchanged without having to raise the entire arrangement of mirror carriers and mirrors. Even in medium-sized apparatuses, they weigh in the region of a few tonnes.

In a further preferred variation of the invention, construction and maintenance of the apparatus are simplified in that the carrier is detachably connected to the cylinder and, in particular, may be removed upwardly from the divisible cylinder.

The parts of the cylinder are preferably connected by snap connections or screw connections, in particular by self-tapping or self-embossing screws.

Assembly of the preferably divisible cylinder is simplified in that the individual parts of the cylinder 8 form a fitting connection with one another, for example via mating tongue and groove combinations.

In a particularly preferred design, the axial dimension (width) of the cylinder is greater than the axial dimension (width) of the rollers, in particular is at least as great as the maximum thermal expansion in length of the carrier or of the portion of the carrier adjacent to the cylinder.

A drive collar which is connected with the drive means for the movement of the mirrors is additionally provided laterally on the cylinder. This allows the transmission of force from the driving means directly to the cylinder.

Owing to their properties which are particularly suitable for use in deserts, thermoplastic polymers, particularly preferably the partially crystalline thermoplastic materials such as polyamides, in particular polyamide 6 or copolymers and mixtures based on polyamide 6, polyolefins, in particular polypropylene, polyester, in particular polybutylene terephthalate are particularly preferably used as construction material for the cylinder, the rollers, the rolling bearing or parts thereof, for the toothed disc and other constructional elements of the apparatus independently of one another. Polyamide 6 has proven excellent. The friction between moving parts is reduced with these polymers, so it may possibly be unnecessary to use lubricants.

Owing to the particular requirements of stiffness and dimensional stability required for the parts which are markedly stressed externally, in particular due to the action of sand, the thermoplastic polymer may be reinforced with glass fibres, preferably with a glass fibre content of 15 to 50 wt. %. The length of the glass fibres may be 150 to 500 µm and the diameter of the glass fibres 5 to 20 µm.

The plastics material may also be provided with additives, pigments and stabilisers and, in particular, be particularly protected against the expected high UV exposure, in particular with UV stabilisers, by basically known processes.

With increased demands in strength and stiffness, this partially crystalline plastics material may be used in combination with specially shaped metal sheets for the construction of the above-mentioned parts, in particular employing the so-called metal/plastics hybrid technology, a plastics/metal composite.

The invention also relates to a particular mirror holder for reflector mirrors of a solar heating apparatus as described. The mirror holder according to the invention consists at least of a detachable receiving bush with a counterpart for the mirror carrier, a transverse strut connected thereto and clip connections surrounding the edges of the mirrors at the ends of the transverse struts.

The mirror holder for reflector mirrors of a solar heating apparatus connects a rotatable carrier, in particular a carrier tube, to the mirror.

For receiving a plurality of reflector mirrors, the mirror holder consists of at least one torsion-resistant carrier, in particular a carrier tube, and a plurality of preferably detachable connecting elements which are distributed over the carrier and are detachably connected to the mirror.

At least the transverse strut consists of a plastics material part or plastics/metal composite part consisting of a shell-shaped metal base with plastics material struts connected thereto, in particular by injection moulding.

The apparatus for utilising solar energy is particularly preferably based on a fundamental construction of the solar heating apparatus described in detail in the Offenlegungsschrift WO 99/42765. The content of the Offenlegungsschrift WO 99/42765 is therefore explicitly included in the description as a reference and counts as part of the disclosure.

The invention will be illustrated in more detail by the examples, which do not restrict the invention, with reference to FIGS. 1–13.

EXAMPLE

FIG. 1 is an overall schematic view of the apparatus for utilising solar energy. The rows of mirrors 3, rotatable about an axis, are arranged on a framework 5 in the lower region. The rows of mirrors 3 lying next to one another in parallel form a mirror face with a width of about 24 m from which the sunlight impinging on the mirror face is reflected to the collector 14 located about 9 m above it. The mirrors 3 are automatically tracked in their angle by electrically operated drives, depending on the solar altitude. The collector 14 located about 9 m above them, in turn, has a mirror face which reflects the sunlight from the mirrors 3, not impinging directly on the collector tube 19 (see FIG. 2) to the collector tube 19. The curvature of the collector mirror 14 is so orientated that the sunlight arriving from the mirrors 3 is reflected only once before it impinges on the collector 19. The collector is permeated by a heat exchange medium (water), which has the function of carrying off and reusing the radiant energy absorbed by the collectors 19. The heat carrier medium cooled in a power generating plant (not shown) is reintroduced at the entrance of the collectors 19.

Figure 8:
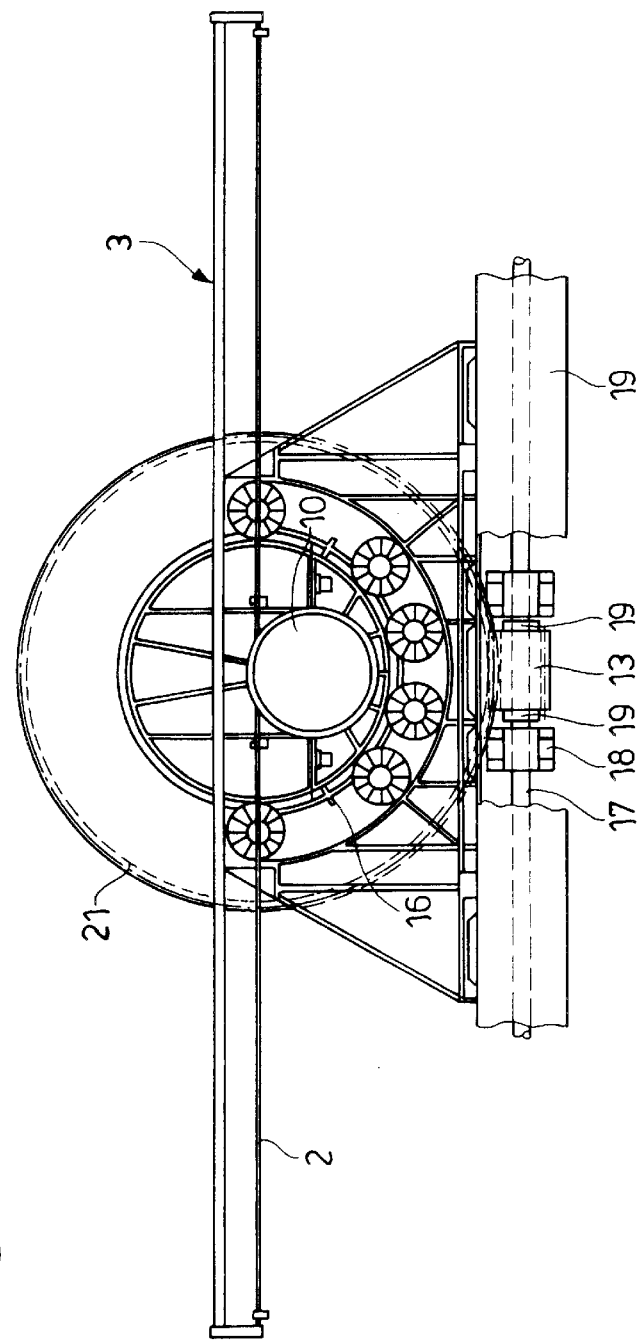
FIG. 8 is a cross-section through the construction comprising mirror, mirror carrier, cylinder, rolling bearing and drive worm for the mirror.
Figure 10:
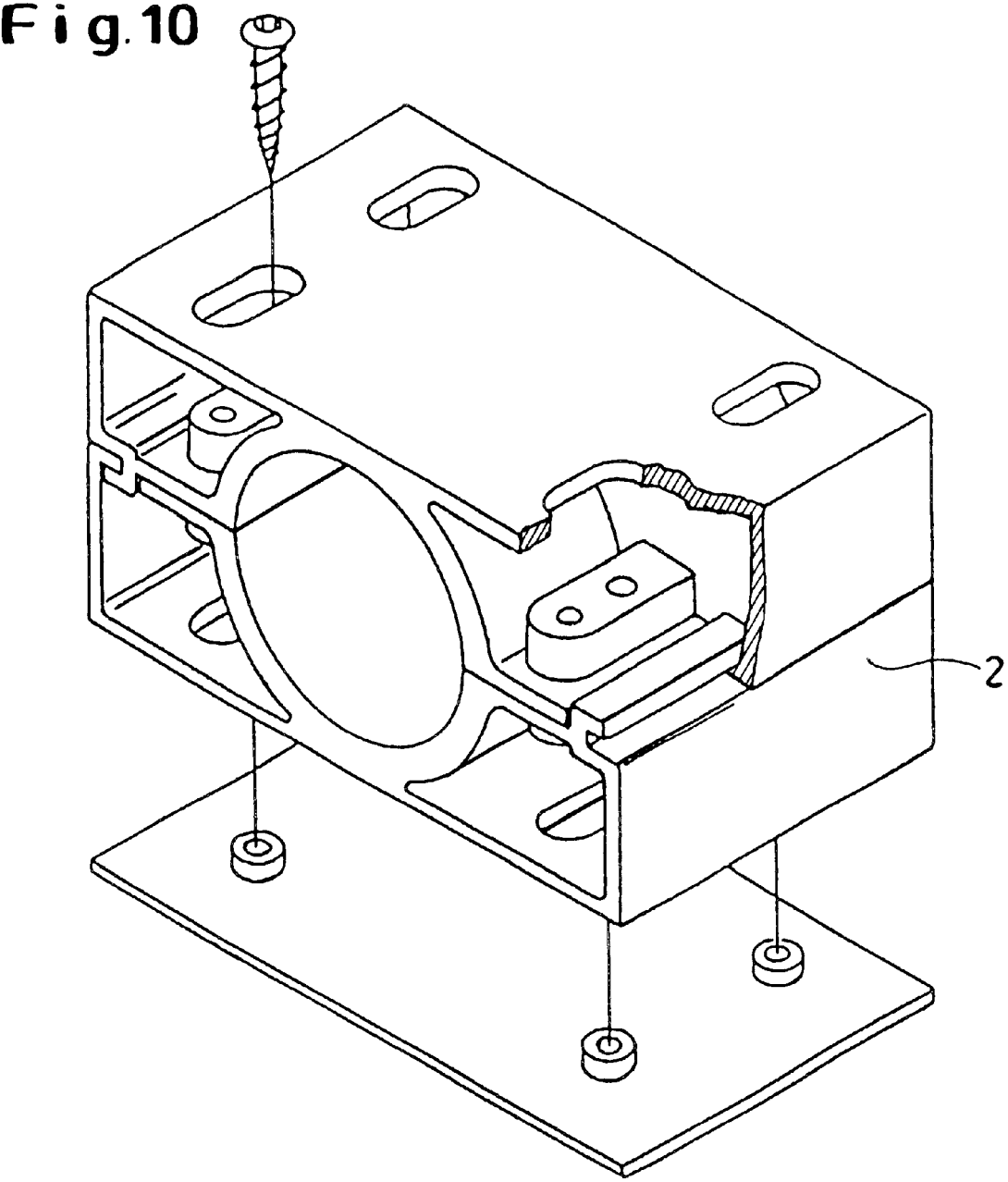
FIG. 10 shows a mirror holder for connecting mirror and mirror carrier.
Figure 11:
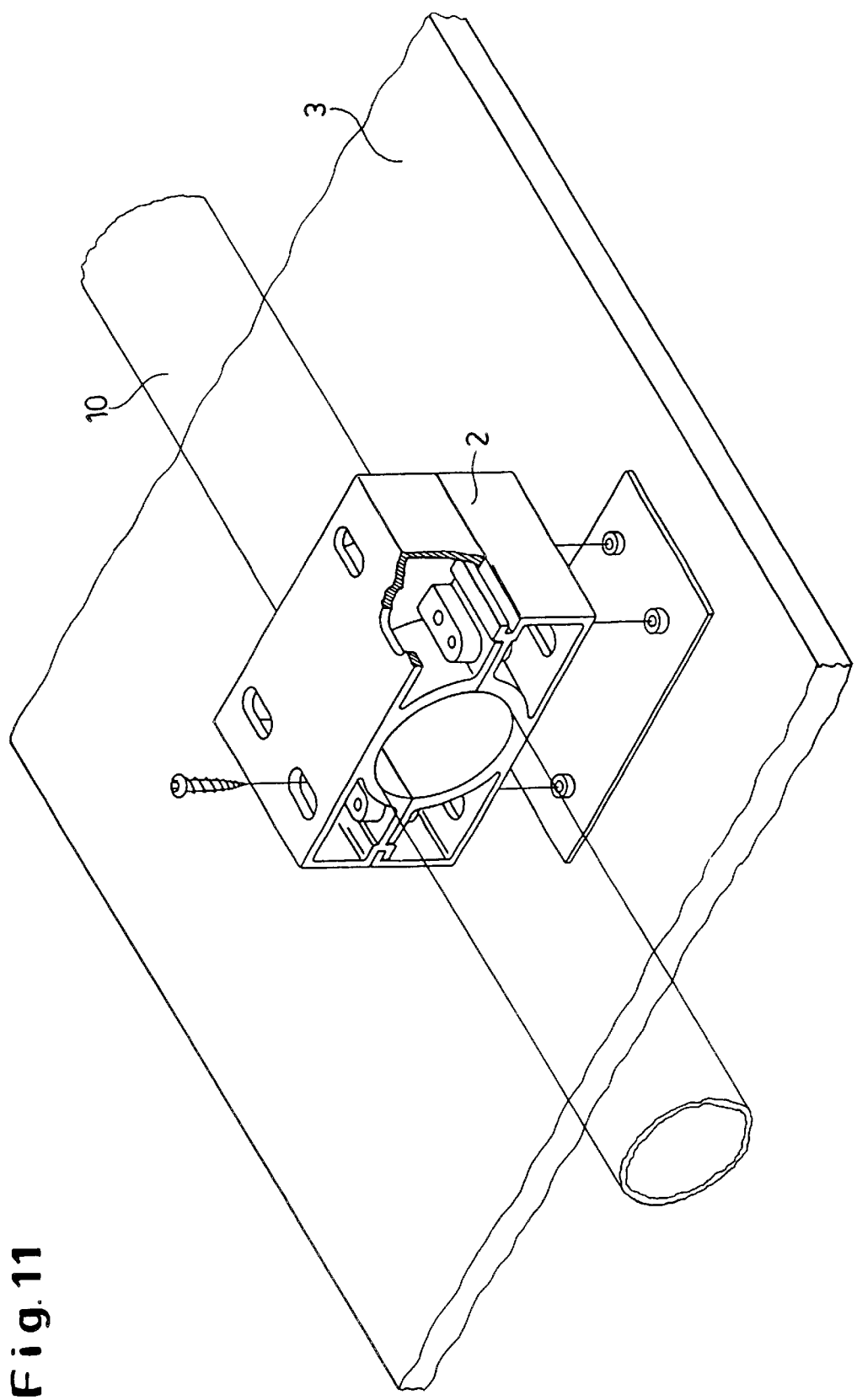
FIG. 11 shows the arrangement of mirror holder, mirror and mirror carrier.
Figure 12:
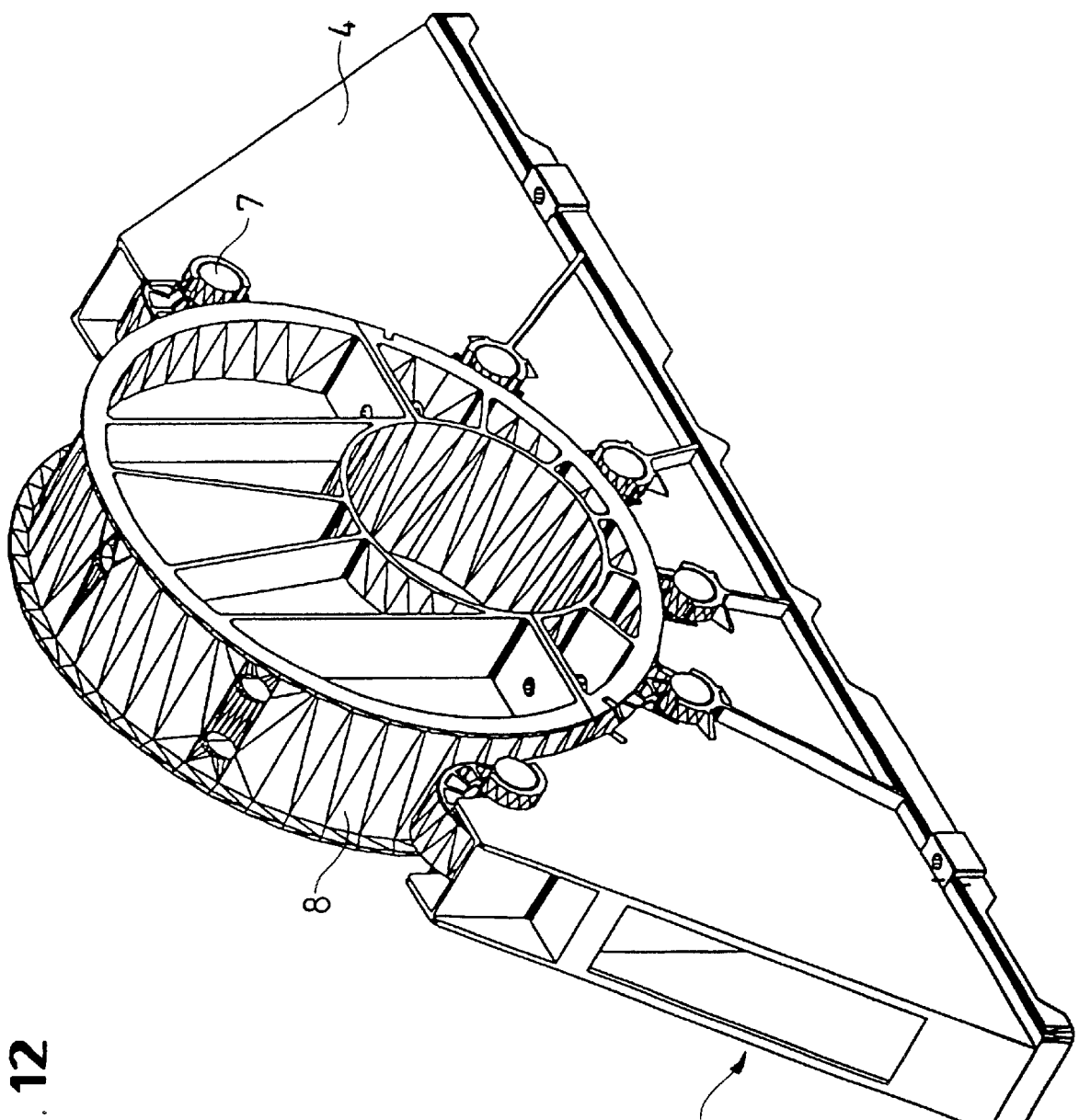
FIG. 12 is a side view of a rolling bearing according to the invention.

FIG. 8 shows a cross-section through a row of mirrors. The mirrors 3 are mounted on a transverse carrier 2 which, in turn, is fastened on the carrier tube 10. The carrier tube 10 typically has a length of 100 to 200 m in large apparatuses. Temperature variations in the desert cause lengthening of the mirrors and of the carrier tube 10. The coefficient of thermal expansion for glass and steel differ. The steel of the construction expands due to temperature variations, and this has to be compensated, in addition to expansion of the carrier tube 10 located on the same construction. This affects the bearing 1 provided on the construction, so special control movements may be required to keep the bearing in the correct position.

The three mirrors arranged side by side according to FIG. 8 are fastened on polyurethane material. The polyurethane insulates the hot mirrors from the metal construction and optionally absorbs impacts from hail and wind, etc. A mirror segment is 2018 mm long, 1500 mm wide and consists of three mirrors. The mirrors are fastened on a rectangular profile 2 by clips and can expand freely and independently of the carrier tube 10. Three rectangular supports provided on the carrier tube 10 carry the mirror arrangement. Three mirror arrangements are provided on the same carrier tube 10 between two bearings 1. All carrier tubes 10 of the apparatus are mounted rotatably via a plurality of roller bearings 1 distributed over the length of the carrier tubes 10 (see FIG. 8). The rolling bearing 1 is shown in detail in FIGS. 3 and 5. The rolling bearing 1 consists of a foot 4 which is fastened on the transverse carrier 20 of the framework 15 of the apparatus. The bearing foot 4 passes into the roller carrier regions which has a semicircular shape, as shown in FIG. 3.

Distributed over the roller carrier region 5 are six roller bushes 6, in which rollers 7 are engaged and in which the rollers 7 can rotate freely (see also FIG. 8). The rollers 7 carry the cylinder 8 of the rolling bearing 1. According to FIG. 5, the cylinder 8 is to be separated into two parts 8a and 8b. For assembly, the lower half 8a is placed onto the rollers 7 and calibrated by means of the grooves 16. For this purpose, appropriate springs are placed into the grooves 16 which face one another on the roller carrier region 5 and the cylinder part 8a. The carrier tube 10 is placed on the fixed cylinder part 8a. The upper cylinder part 8a is screwed to the lower cylinder part 8b, a tongue and groove combination 11 ensuring that the parts 8a and 8b fit one another exactly. The cylinder 8 is wider in design than the rollers 7 underneath, as viewed in the lengthwise direction of the carrier tubes 10. The thermal expansion of the carrier tubes 10 can therefore be compensated and the cylinder 8 can be prevented from breaking out. This is assisted in operation in that the drive controller of the cylinder 8 causes short compensating movements of the cylinders 8 from time to time, allowing the cylinder 8 to slip through on the rollers 7 in the roller bearing region 5. The slipping of the cylinder 8 can be additionally simplified by using thermoplastic polymer (polyamide 6) as material for the cylinder 8 and the rollers 7. The use of glass fibre-reinforced polyamide 6 also makes it unnecessary to use lubricant.

As may be inferred from FIG. 8, the carrier tubes 10 are provided eccentrically in the cylinders 8, so the weight of the mirror construction is compensated by the weight of the carrier tubes 10 during a rotational movement in the cylinder 8 on the rollers 7. This enables the great mass of the mirror construction to be rotated with slight expenditure of force in order to adjust the reflector mirrors 3 according to the solar altitude.

Selected cylinders 8 along the carrier tubes 10 are provided with a drive collar 12 by means of which the cylinders 8 of the rolling bearing 1 may be driven by a drive roller (not shown in FIG. 5).

The drive is effected in the following manner in the embodiment according to FIG. 8. The drive worms 13 are placed on the shaft 10 and fixed in their position on the shaft 17 by the clips 19 and 19'. The thread of the worm 13 engages in the teeth of the toothed disc 21 (see FIG. 12). The bearings 18 for the shaft 17 are advantageously raised somewhat after fastening the worm 13, so the weight of the toothed disc 21 connected to the cylinder 8 is carried by the worm 13. The bearings 18 are provided with slots for this purpose. The thread of the worm additionally engages only partially in the space between the teeth of the toothed disc 21, so any abrasion of the teeth of the toothed disc 21 is automatically compensated.

The shafts 17 are prevented from deflecting along their axis in that guide elements (steel balls) which prevent axial movement of the shafts 17 are provided at the ends.

The high precision of the mirror tracking of 0.1° necessitates an angular deviation of 0.02° in the control position. The deviation measured by a position encoder on the axis and a position encoder between the mirror surface and the absorbing tube allows such fine control. The electric motor on the drive mechanism is a non-synchronous motor running at 1,500 rpm. The reduction gear and the transmission ratio between the worm 13 and the tracking wheel (toothed wheel 21) produce an excessive angular deviation when the motor is started even for only a short time. A frequency controller on the power line from the motor allows control if the system is operated with the lowest motor speed. If a warning about an excessively high temperature appears at the absorber tube 14, etc., the mirrors 3 must be switched into a safe position as quickly as possible.

Figure 13:
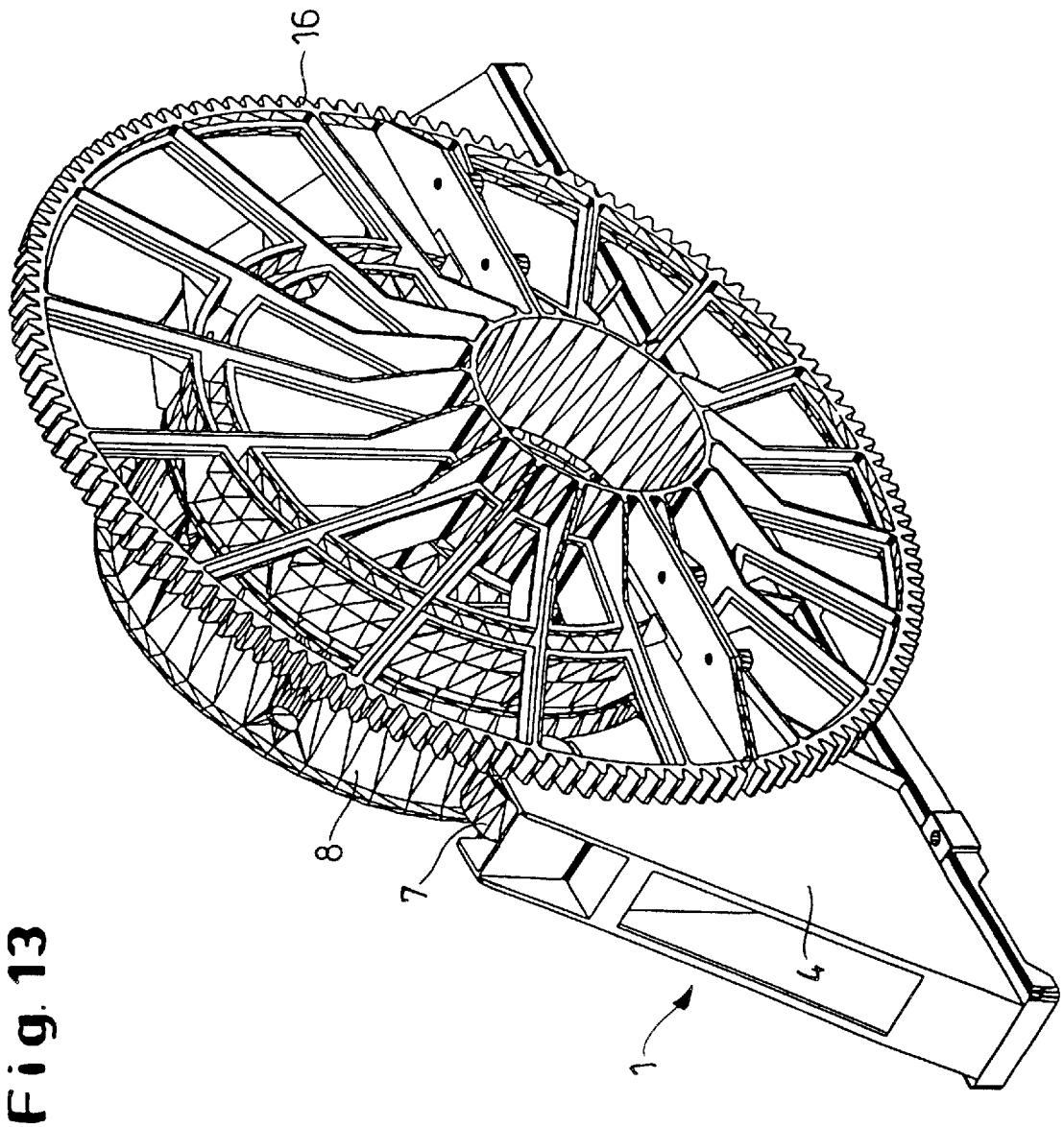
FIG. 13 is a side view of a rolling bearing with drive pinion.

With the tracking wheel 21 according to FIG. 13, the total weight during the rotation is a few thousand kilograms. The tracking wheel 21 is fastened on the inner cylinder 8. A circular plug-in tooth extension on the inner cylinder 8 is stuck to a circular receiving groove formed on the tracking wheel 21. The inner cylinder 8 and the tracking wheel 21 consist of two parts. The parts of both may be installed locally in the exact position by screws and can then be stuck so it is always possible to disassemble the tracking wheel 21 and the inner cylinder 8.

The force acting on the tracking shaft 17 to rotate the mirrors 3 is fairly low. 4.5 kg/m are measured under operating conditions. The reason for using a reduction gear with a transmission ratio of 1 to 64 is the use of a non-synchronous motor. The number of revolutions per minute is too high to produce a fraction of a revolution on the tracking shaft 17. The power supply to the non-synchronous motor is provided by a frequency controller which allows the motor to be slowed down to 10 percent of its speed. This results in very fine control of the displacement of the mirrors with the necessary angle of 0.1°. A non-synchronous motor is selected on account of its simplicity and low costs, the negligible maintenance costs, the dust-free and watertight conditions, the simple electronic controller, etc.

Alternatively to the design shown in FIG. 8, the mirrors 3 may be fastened on the carrier tubes 10 by the fastening elements 2. For this purpose, the parts 2a and 2b surrounding the carrier tube 10 are screwed continuously through the mirror 3 to the lower plate 2c. In this arrangement, only one mirror 3 rather than three mirrors are arranged above the carrier tube 10 as viewed in cross-section.

In an alternative design, the upper part 2a is stuck to the underside of the mirror 3. The part 2b underneath is screwed to the upper part 2a, the carrier tube 10 being clamped between the parts 2a and 2b. Additional blocks made of foam rubber or polyurethane foam prevent the mirrors 3 from fluttering in varying wind pressure.

The described arrangement enables the rows of mirrors 3 extending in parallel next to one another to move simultaneously according to the solar altitude, as the worm drives resting on a shaft 17 move the mirrors 3 simultaneously on the carriers 10a, 10b located next to one another. Adjacent mirrors 3 are set differently according to the optimum angle of reflection.

Polyamide 6, reinforced with glass fibres, has proven particularly advantageous for the construction of the rolling bearings 1, the worms 13, the rollers 7 and the toothed disc 21. On the one hand, the overall weight of the apparatus is considerably reduced by the use of the plastics material.

On the other hand, the plastics material used is surprisingly resistant to stresses due to weathering and sand and dust, in particular desert sand, which is comparatively finely divided, so the plastics parts sliding or rolling on one another do not clog and become blocked even after prolonged contamination.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

what is claimed is:

1. An apparatus for utilising solar energy comprising:
    (a) a plurality of movable mirrors which are arranged in parallel next to one another, are orientable according to the solar altitude, and are fastened on carriers;
    (b) at least one stationary collector for absorbing the radiation reflected by the mirrors (a);
    (c) a drive means for rotating the mirrors (a) and carriers in order to orientate the mirrors (a) in such a way that the solar radiation impinging on the mirrors is reflected onto the collector (b); and
    (d) a framework supporting said mirrors (a), said carriers, said stationary collector (b) and said drive means (c), wherein the mirrors (a) of the carriers are mounted rotatably about an axis of rotation, that is parallel to the length of the mirrors, in such a way that the weight of the mirrors (a) and the weight of the carriers are substantially in equilibrium in any position about said axis of rotation.

2. The apparatus of claim 1 wherein the mirrors (a) are mounted rotatably by means of a plurality of rolling bearings connected to the carrier.

3. The apparatus of claim 1 wherein the carrier has a round cross-section.

4. The apparatus of claim 2 wherein the carrier is arranged eccentrically in a cylinder of the rolling bearing.

5. The apparatus of claim 4 wherein the rolling bearing comprises at least one foot connected to a roller carrier region with concave shaping, wherein, a plurality of roller bushes containing free-wheeling rollers which carry the cylinder with the mirror carriers are distributed around the periphery of the roller carrier region.

6. The apparatus of claim 1 wherein the drive means for the mirrors (a) is self-locking relative to the forces acting on the drive means from the mirrors (a) or carriers.

7. The apparatus of claim 5 wherein at least one combination of a worm and a toothed disc connected directly or indirectly to a drive motor is provided as the drive means, the toothed disc being connected directly to the carrier or to a the cylinder.

8. The apparatus of claim 7 wherein the toothed disc rests on the worm without play.

9. The apparatus of claim 5 wherein the roller bushes are arranged open toward the axis of the cylinder such that the rollers can be removed in the direction of the cylinder axis.

10. The apparatus of claim 9 wherein the rollers with the roller bushes of the roller carrier region are held by a snap connection.

11. The apparatus of claim 5 wherein the curvature of the roller carrier region forms a semicircle.

12. The apparatus of claim 5 wherein the rollers are arranged unsymmetrically on the periphery of the roller carrier region.

13. The apparatus of claim 5 wherein more rollers are distributed on the peripheral portion in the lower region of the roller carrier region than in the upper portions of the roller carrier region.

14. The apparatus of claim 5 wherein two opposing rollers support the cylinder laterally at the upper part of the roller carrier region.

15. The apparatus of claim 2 wherein the rolling bearing is formed as an open framework.

16. The apparatus of claim 5 wherein the roller bushes are provided with moulded support struts arranged radially to the curvature of the roller bushes and open at the foot of the rolling bearing.

17. The apparatus of claim 4 wherein the cylinder which connected to the mirror carrier has a divisible design.

18. The apparatus of claim 5 wherein a calibration means is provided on the cylinder and on the roller carrier region.

19. The apparatus of claim 4 wherein the carrier is detachably connected to the cylinder.

20. The apparatus of claim 19 wherein the cylinder is a divisible cylinder having parts, and the parts of the divisible cylinder are connected by means of snap connections or screw connections.

21. The apparatus of claim 19 wherein said cylinder is a divisible cylinder having mutually adjacent individual parts which together form a fitting connection.

22. The apparatus of claim 5 wherein the axial dimension of the cylinder is greater than the axial dimension of the rollers.

23. The apparatus of claim 4 wherein a drive collar which is connected with the drive means for the movement of the mirrors is additionally provided laterally on selected cylinders.

24. The apparatus of claim 1 wherein vibration damping means are provided between the mirrors and the carrier.

25. The apparatus of claim 5 wherein stopper rollers which restrict axial movement of the rolling bearing are provided on both sides of the rolling bearing with drive.

26. The apparatus of claim 7 wherein at least one thermoplastic polymer is used as construction material for the cylinder, the rollers, the rolling bearing or parts thereof, for the toothed disc, and other constructional elements of the apparatus independently of one another.

27. The apparatus of claim 26 wherein said thermoplastic polymer comprises glass fibre-reinforcing material.

28. The apparatus of claim 1 further comprising a mirror holder for said mirror said mirror holder comprising a detachable receiving bush with a counterpart for receiving said mirror carrier, a transverse strut connected to the receiving bush, and clip connections at the ends of the transverse struts which surround the edges of the mirrors.

29. The apparatus of claim 3 wherein the carrier has a tubular profile.

30. The apparatus of claim 5 wherein said foot has the geometric shape of a segment of a circle.

31. The apparatus of claim 5 wherein six roller brushes are distributed around the periphery of the roller carrier region.

32. The apparatus of claim 16 wherein the support struts are formed by injection moulding.

33. The apparatus of claim 17 wherein said cylinder has a two-part design.

34. The apparatus of claim 19 wherein said cylinder is a divisible cylinder, and said carrier is upwardly detachable from said divisible cylinder.

35. The apparatus of claim 20 wherein the parts of the divisible cylinder are connected by means of self-tapping or self-embossing screws.

36. The apparatus of claim 21 wherein the mutually adjacent individual parts of said divisible cylinder form a fitting connection by means of mating tongue and groove combinations.

37. The apparatus of claim 5 wherein the axial dimension of the cylinder is equal to or greater than at least one of: (i) the maximum thermal expansion in length of the carrier; or (ii) the portions of the carrier adjacent to the cylinder.

38. The apparatus of claim 24 wherein the vibration damping means are fabricated from a material selected from at least one of foam rubber and polyurethane foam.

39. The apparatus of claim 26 wherein said thermoplastic material is selected from polyamides, polyolefins, polyesters and mixtures thereof.

40. The apparatus of claim 39 wherein said thermoplastic material is selected from polyamide 6, polypropylene, polybutylene terephthalate and mixtures thereof.

41. The apparatus of claim 27 wherein said thermoplastic polymer comprises from 15 to 50 wt. % of said glass fibre-reinforcing material, said glass fibre-reinforcing material having at least one of (i) a fibre length of 150 to 500 $\mu$m and (ii) a fibre diameter of 5 to 20 $\mu$m.

* * * * *